United States Patent
Cao et al.

(10) Patent No.: US 9,667,161 B2
(45) Date of Patent: May 30, 2017

(54) POWER CONVERTER AND METHOD FOR CONTROLLING POWER CONVERTER THAT ADJUST DUTY CYCLE OF SWITCHING CIRCUIT BASED ON INPUT VOLTAGE

(71) Applicant: Murata Manufacturing Co., Ltd., Nagaokakyo-shi, Kyoto-fu (JP)

(72) Inventors: Yu Cao, Shanghai (CN); Kezhi Wang, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 2 days.

(21) Appl. No.: 14/226,974

(22) Filed: Mar. 27, 2014

(65) Prior Publication Data

US 2014/0293658 A1    Oct. 2, 2014

(30) Foreign Application Priority Data

Mar. 29, 2013    (CN) .......................... 2013 1 0109302

(51) Int. Cl.
*H02M 3/335*    (2006.01)
*H02M 1/00*    (2006.01)

(52) U.S. Cl.
CPC .................. *H02M 3/33576* (2013.01); *H02M 2001/0022* (2013.01)

(58) Field of Classification Search
CPC ......... H02M 2001/0022; H02M 3/156; H02M 3/158; H02M 3/33507; H02M 3/33523; H02M 3/33553
See application file for complete search history.

(56) References Cited

U.S. PATENT DOCUMENTS

| | | | |
|---|---|---|---|
| 4,437,146 A * | 3/1984 | Carpenter | H02M 1/4225 323/222 |
| 5,804,950 A * | 9/1998 | Hwang | H02M 1/4225 323/222 |

(Continued)

FOREIGN PATENT DOCUMENTS

| | | |
|---|---|---|
| CN | 2822024 Y | 9/2006 |
| CN | 101755382 A | 6/2010 |

(Continued)

OTHER PUBLICATIONS

Partial Translation of Official Communication issued in corresponding Chinese Patent Application No. 201310109302.8, mailed on Sep. 29, 2015.

*Primary Examiner* — Matthew Nguyen
*Assistant Examiner* — Yusef Ahmed
(74) *Attorney, Agent, or Firm* — Keating & Bennett, LLP (57) ABSTRACT

A power converter includes a switching circuit, a power conversion circuit that receives an input voltage via the switching circuit and converts the input voltage into an output voltage, an input voltage sense circuit that detects the input voltage and generates an input voltage sense signal, and a PWM controller that adjusts a duty cycle of the switching circuit based at least in part on the input voltage sense signal. The power converter also includes an output sense circuit that detects the output voltage and generates an output voltage sense signal, wherein the PWM controller adjusts the duty cycle of the switching circuit based at least in part on the input voltage sense signal and the output voltage sense signal.

18 Claims, 7 Drawing Sheets

(56) References Cited

U.S. PATENT DOCUMENTS

| | | | | | |
|---|---|---|---|---|---|
| 5,870,294 | A | * | 2/1999 | Cyr | H02M 1/44 323/222 |
| 5,903,138 | A | * | 5/1999 | Hwang | H02M 1/4225 323/224 |
| 6,348,755 | B1 | * | 2/2002 | Shimamura | H01L 41/044 310/318 |
| 7,613,017 | B1 | * | 11/2009 | Diana | H02M 3/33507 363/20 |
| 7,633,782 | B1 | * | 12/2009 | Herbert | G05F 1/70 323/207 |
| 7,782,002 | B2 | * | 8/2010 | Cook, II | H02M 1/32 318/461 |
| 8,861,236 | B2 | * | 10/2014 | Remmert | H02M 3/28 323/207 |
| 2002/0080675 | A1 | * | 6/2002 | Feurle | G05F 1/56 365/226 |
| 2003/0090237 | A1 | * | 5/2003 | Shenai | H02J 7/0052 320/139 |
| 2004/0189271 | A1 | * | 9/2004 | Hansson | H02M 3/33515 323/283 |
| 2005/0010826 | A1 | * | 1/2005 | Pullen | H02M 3/156 713/300 |
| 2005/0046404 | A1 | * | 3/2005 | Uusitalo | H02M 3/33569 323/285 |
| 2005/0068796 | A1 | * | 3/2005 | Morita | H02M 1/4225 363/120 |
| 2007/0176584 | A1 | * | 8/2007 | Chen | H02M 3/33507 323/282 |
| 2007/0236977 | A1 | * | 10/2007 | Rossi | H02M 3/1582 363/132 |
| 2008/0137379 | A1 | * | 6/2008 | Mao | H02M 3/157 363/17 |
| 2009/0009148 | A1 | | 1/2009 | Philbrick | |
| 2009/0066305 | A1 | * | 3/2009 | Noda | H02M 3/1588 323/282 |
| 2009/0128116 | A1 | * | 5/2009 | Noda | H02M 3/1588 323/290 |
| 2009/0231895 | A1 | * | 9/2009 | Hu | H02M 3/33592 363/127 |
| 2009/0278520 | A1 | * | 11/2009 | Perreault | H02M 3/07 323/282 |
| 2010/0026208 | A1 | * | 2/2010 | Shteynberg | H05B 33/0815 315/297 |
| 2010/0033143 | A1 | * | 2/2010 | Asuncion | H02M 3/156 323/247 |
| 2010/0052627 | A1 | * | 3/2010 | Otsuka | H02M 3/156 323/225 |
| 2010/0103703 | A1 | * | 4/2010 | Nishiyama | H02M 3/3376 363/17 |
| 2010/0127682 | A1 | | 5/2010 | Kenly et al. | |
| 2010/0195355 | A1 | * | 8/2010 | Zheng | H02M 3/33507 363/21.12 |
| 2010/0208502 | A1 | * | 8/2010 | Horii | H02M 3/33507 363/131 |
| 2010/0225293 | A1 | * | 9/2010 | Wang | H02M 3/33507 323/290 |
| 2010/0321958 | A1 | * | 12/2010 | Brinlee | H02M 3/28 363/21.1 |
| 2011/0011842 | A1 | * | 1/2011 | Thomas | B23K 9/1043 219/130.21 |
| 2011/0084676 | A1 | * | 4/2011 | Lin | H02M 3/156 323/283 |
| 2011/0101948 | A1 | * | 5/2011 | Lopata | H02M 3/1588 323/283 |
| 2011/0121870 | A1 | * | 5/2011 | Morino | H03K 17/22 327/143 |
| 2011/0285344 | A1 | * | 11/2011 | Lin | H02J 7/0052 320/107 |
| 2011/0316511 | A1 | * | 12/2011 | Wang | H02M 3/156 323/285 |
| 2012/0014152 | A1 | * | 1/2012 | Nakamura | H02M 1/4258 363/126 |
| 2012/0020119 | A1 | | 1/2012 | Tang et al. | |
| 2012/0020135 | A1 | * | 1/2012 | McCune | H02M 7/2176 363/127 |
| 2012/0062194 | A1 | * | 3/2012 | Wang | H02M 3/156 323/282 |
| 2012/0105028 | A1 | * | 5/2012 | Horman | H02M 1/15 323/266 |
| 2012/0306466 | A1 | * | 12/2012 | Tabuchi | H02M 3/156 323/282 |
| 2013/0051096 | A1 | * | 2/2013 | Carletti | H02M 1/4225 363/84 |
| 2013/0082611 | A1 | * | 4/2013 | Cohen | H05B 33/0815 315/185 R |
| 2013/0250627 | A1 | * | 9/2013 | Herfurth | H02M 3/3376 363/21.15 |
| 2013/0301317 | A1 | * | 11/2013 | Ishii | H02M 1/4225 363/44 |
| 2013/0335043 | A1 | * | 12/2013 | He | H02M 3/04 323/234 |
| 2013/0343094 | A1 | * | 12/2013 | Karlsson | H02M 3/33507 363/17 |
| 2014/0103861 | A1 | * | 4/2014 | Carletti | H02M 1/4225 320/107 |
| 2015/0009719 | A1 | * | 1/2015 | Ho | H02M 3/33507 363/21.13 |
| 2015/0244270 | A1 | * | 8/2015 | Karlsson | H02M 3/33507 363/17 |
| 2015/0372605 | A1 | * | 12/2015 | Karlsson | H02M 3/3376 363/21.06 |

FOREIGN PATENT DOCUMENTS

| | | |
|---|---|---|
| CN | 102340251 A | 2/2012 |
| TW | 200916997 A | 4/2009 |
| TW | 201025037 A1 | 7/2010 |

* cited by examiner

POWER CONVERTER AND METHOD FOR CONTROLLING POWER CONVERTER THAT ADJUST DUTY CYCLE OF SWITCHING CIRCUIT BASED ON INPUT VOLTAGE

BACKGROUND OF THE PRESENT INVENTION

1. Field of the Present Invention

The present invention relates generally to a power converter and power conversion method, and more particularly, to a system and method for controlling a duty cycle of a switching power supply.

2. Description of the Related Art

Due to the different power requirements of various applications, power converters, such as switching power supplies, are widely employed in the electrical technical field to supply desired voltages/currents. The switching power supply maintains a stable voltage or current output at an output side of a power conversion circuit by controlling the on/off (and thus a duty cycle) of a switching circuit at an input side of the power conversion circuit. Such power conversion circuit may be implemented, for example, with a transformer, which converts an input voltage received at a primary side into an output voltage and current at a secondary side.

In one aspect, it is desirable to improve the efficiency of such power converter, e.g., the ratio of the output power to the input power. In another aspect, it is desirable for such power converter to have a high power density, e.g., the ratio of the output power to the volume of the power converter. In yet another aspect, it is desirable for a power converter to have good Line Regulation and/or Load Regulation. Line Regulation, also known as Input Voltage Regulation, refers to the percentage of the output voltage deviating from the nominal output voltage when the input voltage varies in a full input range. Load Regulation refers to the variation of the output voltage when the load increases from zero to a nominal value under a fixed input voltage.

In the prior art, some power converters have fixed output voltages, and thus may have relatively good Line Regulation and Load Regulation. However, since the duty cycle of the switching circuit may have to be adjusted within a wide range depending on the variation of the input voltage in order to maintain the fixed output voltages, the circuit design is complicated and thus may be unable to satisfy the requirements of high efficiency and high power density. Yet some power converters use a fixed duty cycle for the switching circuit, e.g., a duty cycle of approximately 50%. Such a switching power supply may employ a self-driven synchronization rectifier on the secondary side, and thus the output inductance may be designed to be very small, thereby achieving a relatively high efficiency and high power density. However, with a fixed duty cycle, the output voltage changes along with the input voltage, likely resulting in poor Line Regulation and/or Load Regulation.

SUMMARY OF THE PRESENT INVENTION

Preferred embodiments of the present invention provide a power converter that adjusts a duty cycle within a relatively narrow variation range, so as to provide good load regulation, high efficiency, and/or high power density.

According to a preferred embodiment of the present invention, a power converter includes a switching circuit, a power conversion circuit configured to receive an input voltage via the switching circuit and convert the input voltage into an output voltage, an input voltage sense circuit configured to detect the input voltage and generate an input voltage sense signal, and a PWM controller configured and programmed to adjust a duty cycle of the switching circuit based at least in part on the input voltage sense signal provided by the input voltage sense circuit.

In one preferred embodiment of the present invention, if the input voltage sense signal indicates a change in the input voltage, the PWM controller adjusts the duty cycle of the switching circuit within a preset range such that a change rate of the output voltage is lower than a change rate of the input voltage.

In another preferred embodiment of the present invention, the power converter may further include an output sense circuit configured to detect the output voltage and generate an output voltage sense signal, wherein the PWM controller adjusts the duty cycle of the switching circuit based at least in part on the input voltage sense signal and the output voltage sense signal. Additionally, the power converter may further include a reference voltage module configured to generate a reference voltage based on the input voltage sense signal provided by the input voltage sense circuit such that the reference voltage is proportional to the input voltage, and a first operational amplifier configured to generate a first comparison signal based on a difference between the output voltage sense signal and the reference voltage, wherein the first comparison signal is provided to the PWM controller as a feedback signal, and the PWM controller adjusts the duty cycle of the switching circuit within a preset range according to the feedback signal such that the output voltage is maintained on a level proportional to the reference voltage.

In one preferred embodiment of the present invention, the output sense circuit further detects an output current and generates an output current sense signal, wherein the power converter may further include a second operational amplifier configured to generate a second comparison signal based on a difference between the output current sense signal and the first comparison signal, wherein the second comparison signal is provided to the PWM controller as the feedback signal.

The power converter may be an isolated power converter, and may include an isolator to transfer signals in an isolated manner between a primary side and a secondary side of the power converter.

According to another preferred embodiment of the present invention, a method for controlling a power converter includes receiving an input voltage via a switching circuit and converting the input voltage into an output voltage, detecting the input voltage and generating an input voltage sense signal, and adjusting a duty cycle of the switching circuit based at least in part on the input voltage sense signal.

In one preferred embodiment of the present invention, the method may further include a step of, if the input voltage sense signal indicates a change in the input voltage, adjusting the duty cycle of the switching circuit within a preset range such that a change rate of the output voltage is lower than a change rate of the input voltage.

In another preferred embodiment of the present invention, the method may further include detecting the output voltage and generating an output voltage sense signal, and adjusting the duty cycle of the switching circuit based at least in part on the input voltage sense signal and the output voltage sense signal. The method may further include generating a reference voltage based on the input voltage sense signal such that the reference voltage is proportional to the input voltage; generating a first comparison signal based on a difference between the output voltage sense signal and the reference voltage as a feedback signal, and adjusting the duty cycle of the switching circuit within a preset range according to the feedback signal such that the output voltage is maintained on a level proportional to the reference voltage.

Moreover, the method may further include detecting an output current and generating an output current sense signal, and generating a second comparison signal based on a difference between the output current sense signal and the first comparison signal as the feedback signal.

The power converter may be an isolated power converter, and the method may further include transferring signals in an isolated manner between a primary side and a secondary side of the power converter.

According to yet another preferred embodiment of the present invention, a power converter includes means for receiving an input voltage via a switching circuit and converting the input voltage into an output voltage; means for detecting the input voltage and generating an input voltage sense signal; and means for adjusting a duty cycle of the switching circuit based at least in part on the input voltage sense signal.

In one preferred embodiment of the present invention, the power converter may further include means for adjusting the duty cycle of the switching circuit within a preset range when the input voltage sense signal indicates a change in the input voltage such that a change rate of the output voltage is lower than a change rate of the input voltage.

In another preferred embodiment of the present invention, the power converter may further include means for detecting the output voltage and generating an output voltage sense signal, and means for adjusting the duty cycle of the switching circuit based at least in part on the input voltage sense signal and the output voltage sense signal.

Moreover, the power converter may further include means for generating a reference voltage based on the input voltage sense signal such that the reference voltage is proportional to the input voltage, means for generating a first comparison signal based on a difference between the output voltage sense signal and the reference voltage as a feedback signal, and means for adjusting the duty cycle of the switching circuit within a preset range according to the feedback signal such that the output voltage is maintained on a level proportional to the reference voltage. In addition, the power converter may further include means for detecting an output current and generating an output current sense signal, and means for generating a second comparison signal based on a difference between the output current sense signal and the first comparison signal as the feedback signal.

The power converter may be an isolated power converter, and may further include means for transferring signals in an isolated manner between a primary side and a secondary side of the power converter.

In one preferred embodiment of the present invention, if the input voltage changes, the output voltage varies along with the input voltage, and if the input voltage does not change, the PWM controller adjusts the duty cycle of the switching circuit within a preset range such that the output voltage remains unchanged.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention is described in further detail below in conjunction with specific preferred embodiments and drawings. The following description and accompanying drawings are exemplary, without limiting the scope of the present invention. Elements with the same or like numerals in the drawings may operate similarly. The particular structures shown in the drawings are merely possible examples, and can be modified within the scope of the present invention as desired, without departing from the spirit and scope of the present invention.

Figure 1:
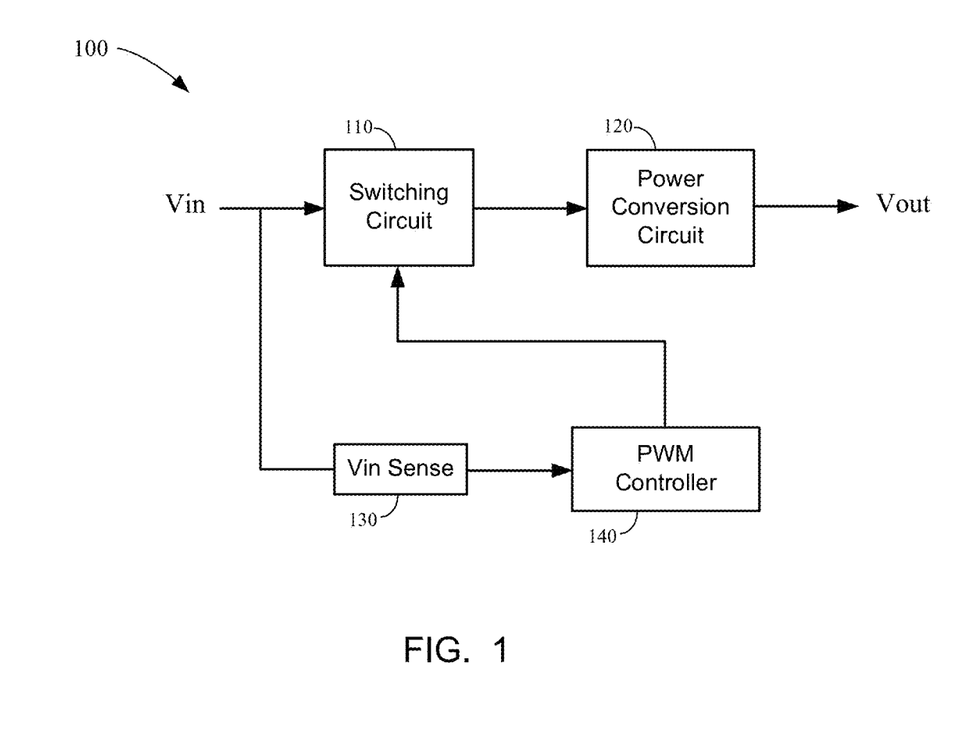
FIG. 1 illustrates a simplified block diagram of a power converter according to a preferred embodiment of the present invention.

FIG. 1 illustrates a simplified block diagram of a power converter 100 according to a preferred embodiment of the present invention. The power converter 100 may be, for example, a DC/DC converter. The power converter 100 may include a switching circuit 110, a power conversion circuit 120, a Vin (input voltage) sense circuit 130 and a PWM (Pulse Width Modulation) controller 140. The power conversion circuit 120 receives the input voltage Vin via the switching circuit 110 and converts it into a desired output voltage Vout (and/or an output current Iout), wherein the PWM controller 140 generates a PWM signal to control the on/off of the switching circuit 110. The on time ratio (i.e., the duty cycle) of the switching circuit 110 will affect the value of the output voltage Vout (and/or the output current Iout). As mentioned in the Background, with a fixed duty cycle, the output voltage Vout varies linearly as the input voltage Vin changes. If the input voltage Vin changes in a wide range, it may cause the output voltage Vout to become unstable. On the other hand, if the duty cycle is adjusted to maintain a fixed output voltage Vout, since the duty cycle may have to vary in a wide range depending on the variation of the input voltage Vin, the power conversion efficiency and power density may be low.

According to a preferred embodiment of the present invention, the Vin sense circuit 130 detects the input voltage Vin and generates an input voltage sense signal Vi. For example, the input voltage sense signal Vi may be a divided signal of the input voltage Vin or may otherwise provide information about the input voltage Vin. The PWM controller 140 may adjust the duty cycle of the switching circuit 110 within a preset range based at least in part on the input voltage sense signal Vi provided by the Vin sense circuit 130, so as to mitigate the instability of the output voltage Vout caused by the variation of the input voltage Vin. For example, if the Vin sense circuit 130 detects an increase in the input voltage Vin, the PWM controller 140 may reduce the duty cycle of the switching circuit 110 such that the output voltage Vout increases slowly as the input voltage Vin increases. Similarly, if the Vin sense circuit 130 detects a decease in the input voltage Vin, the PWM controller 140 may increase the duty cycle of the switching circuit 110 such that the output voltage Vout may decrease slowly as the input voltage Vin decreases. By adjusting the duty cycle in a preset range such that the change rate of the output voltage Vout is lower than the change rate of the input voltage Vin, the stability of the output voltage Vout is improved.

Figure 2:
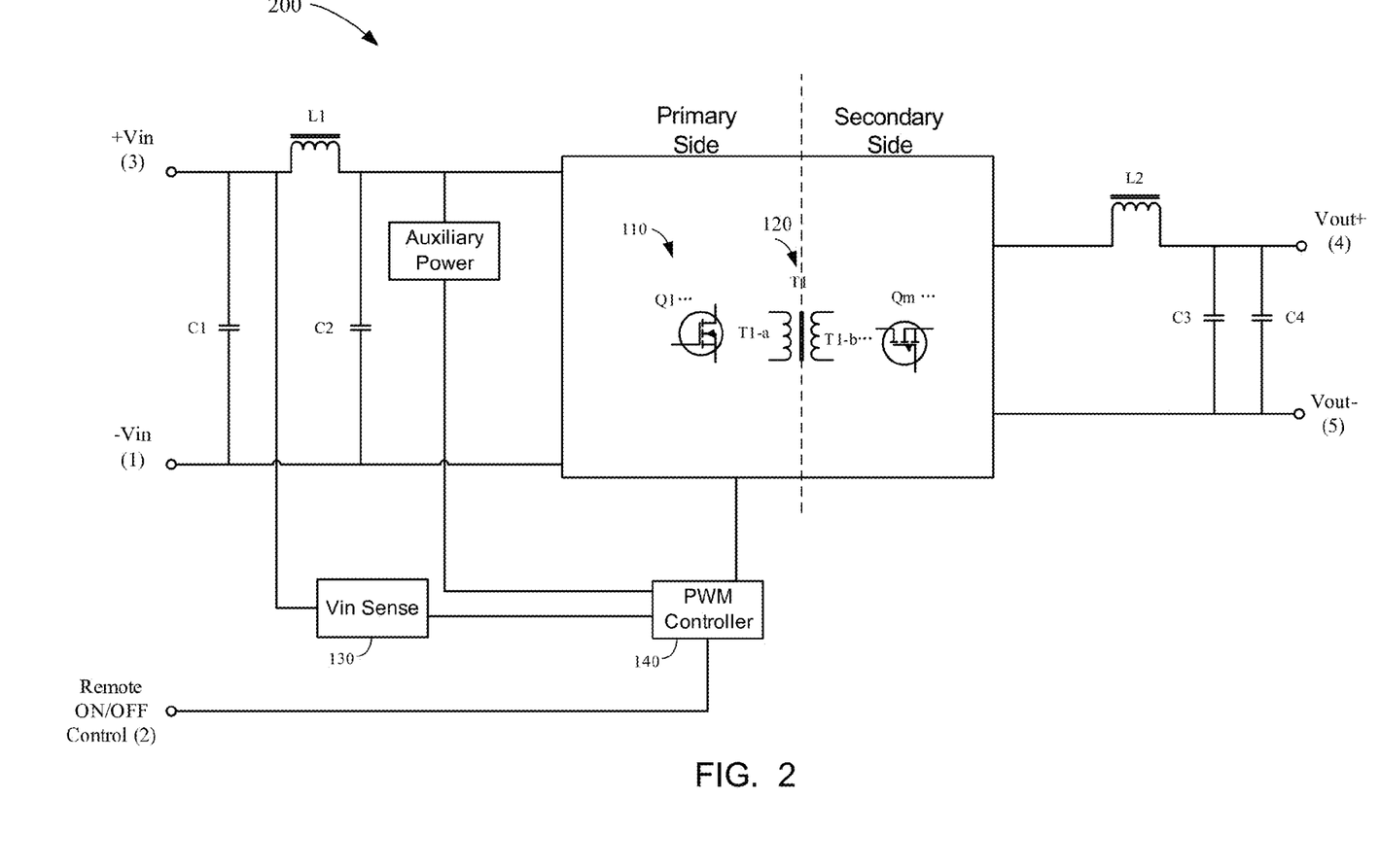
FIG. 2 illustrates a schematic diagram of an exemplary power converter corresponding to FIG. 1 according to a preferred embodiment of the present invention.

FIG. 2 illustrates a schematic diagram of an exemplary power converter 200 corresponding to FIG. 1 according to a preferred embodiment of the present invention. The power converter 200 may include five input/output ports (1)~(5). As illustrated, the input voltage Vin is filtered by a filtering circuit (e.g., including an inductor L1 and capacitors C1, C2) before being inputted into a switching circuit 110. The switching circuit 110 is further coupled to a primary side T1-*a* of a power conversion circuit 120 (e.g., shown as a transformer T1). In FIG. 2, the switching circuit 110 is denoted by a switch Q1, although it may include a switching circuit including one or more switches in implementation. A PWM controller 140 that may be powered by an auxiliary power module, may control the on/off of the switching circuit 110 based on the output of the Vin sense circuit 130 such that the input voltage Vin is selectively inputted into the primary winding T1-*a* of the transformer T1, and thus generates an output at the secondary winding T1-*b* of the transformer T1. This output passes through a secondary switching circuit (e.g., denoted as a switch Qm, which may include one or more switches) and an output filter (e.g., possibly including an inductor L2 and capacitors C3, C4), so as to generate an output voltage Vout and an output current Iout at the output. The PWM controller 140 may further receive other inputs (e.g., remote on/off control), so as to control the on/off of the switching circuit 110. The secondary switching circuit Qm may be controlled by the PWM controller 140, or may be controlled by other control signals (e.g. a voltage on the secondary winding of the transformer T1, not shown). The various switches may be implemented by a variety of techniques known in the art, for example, transistor, field-effect transistor, silicon controlled thyristor, etc.

In a preferred embodiment of the present invention as illustrated in FIG. 2, the PWM controller 140 may adjust the duty cycle of the switching circuit 110 within a preset range based at least in part on the input voltage sense signal Vi provided by the Vin sense circuit 130 such that the change rate of the output voltage Vout is lower than the change rate of the input voltage Vin, thus improving the line regulation and the power conversion efficiency.

Figure 3:
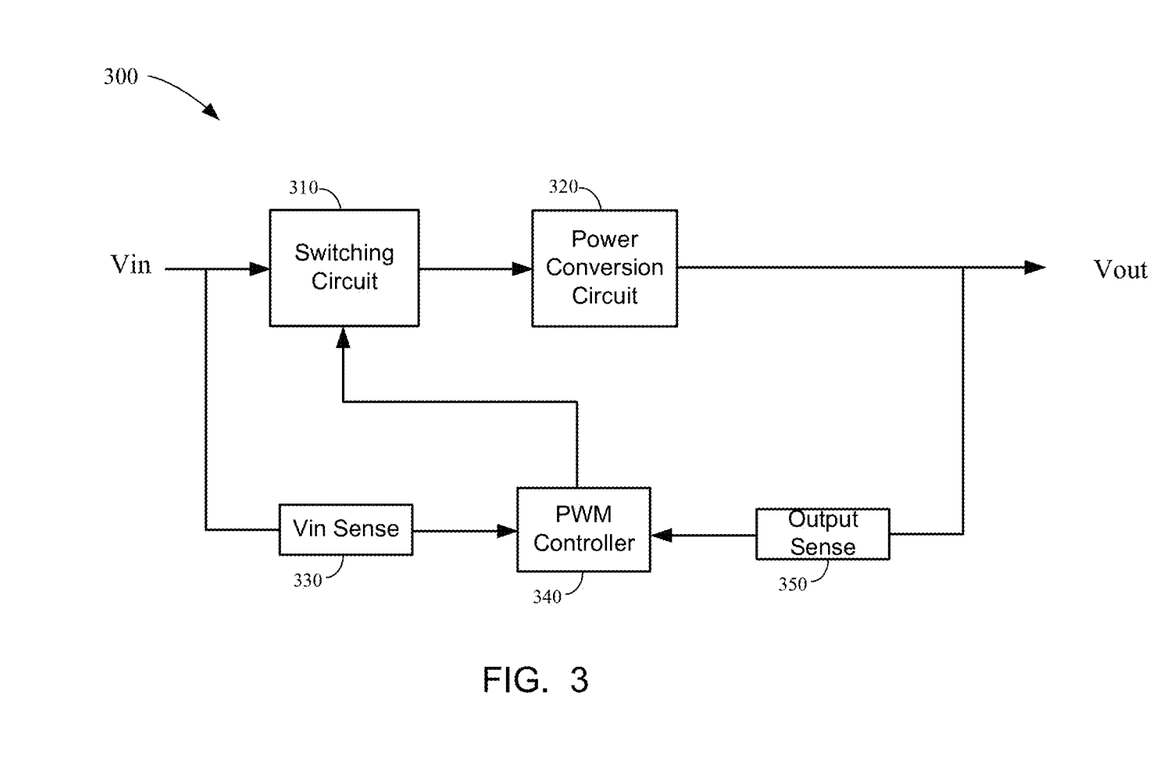
FIG. 3 illustrates a simplified block diagram of a power converter according to another preferred embodiment of the present invention.

FIG. 3 illustrates a simplified block diagram of a power converter 300 according to another preferred embodiment of the present invention. The power converter 300 as shown in FIG. 3 is similar to the power converter 100 as shown in FIG. 1, including a switching circuit 310, a power conversion circuit 320, a Vin sense circuit 330, and a PWM controller 340. The power converter 300 further includes an output sense circuit 350 configured to detect the output voltage Vout (and/or the output current Iout) and generating an output voltage sense signal Vo (and/or an output current sense signal Io). For example, the output voltage sense signal Vo may be a divided signal of the output voltage Vout or may otherwise provide information about the output voltage Vout. The output current sense signal Io may be equal to the output current Iout or may otherwise provide information about the output current Iout. The PWM controller 340 may control the duty cycle of the switching circuit 310 based at least in part on the input voltage sense signal Vi provided by the Vin sense circuit 330 and the output voltage sense signal Vo and/or the output current sense signal Io provided by the output sense circuit 350. For simplicity, the structures and operations of the power converter 300 as shown in FIG. 3 similar to that of the power converter 100 shown in FIG. 1 is not repeated here. In the power converter 300 as shown in FIG. 3, the output sense circuit 350 provides a closed loop control such that the PWM controller 340 may adaptively adjust the duty cycle of the switching circuit 310 based at least in part on the input voltage Vin and the output voltage Vout (and/or the output current Iout).

Figure 4:
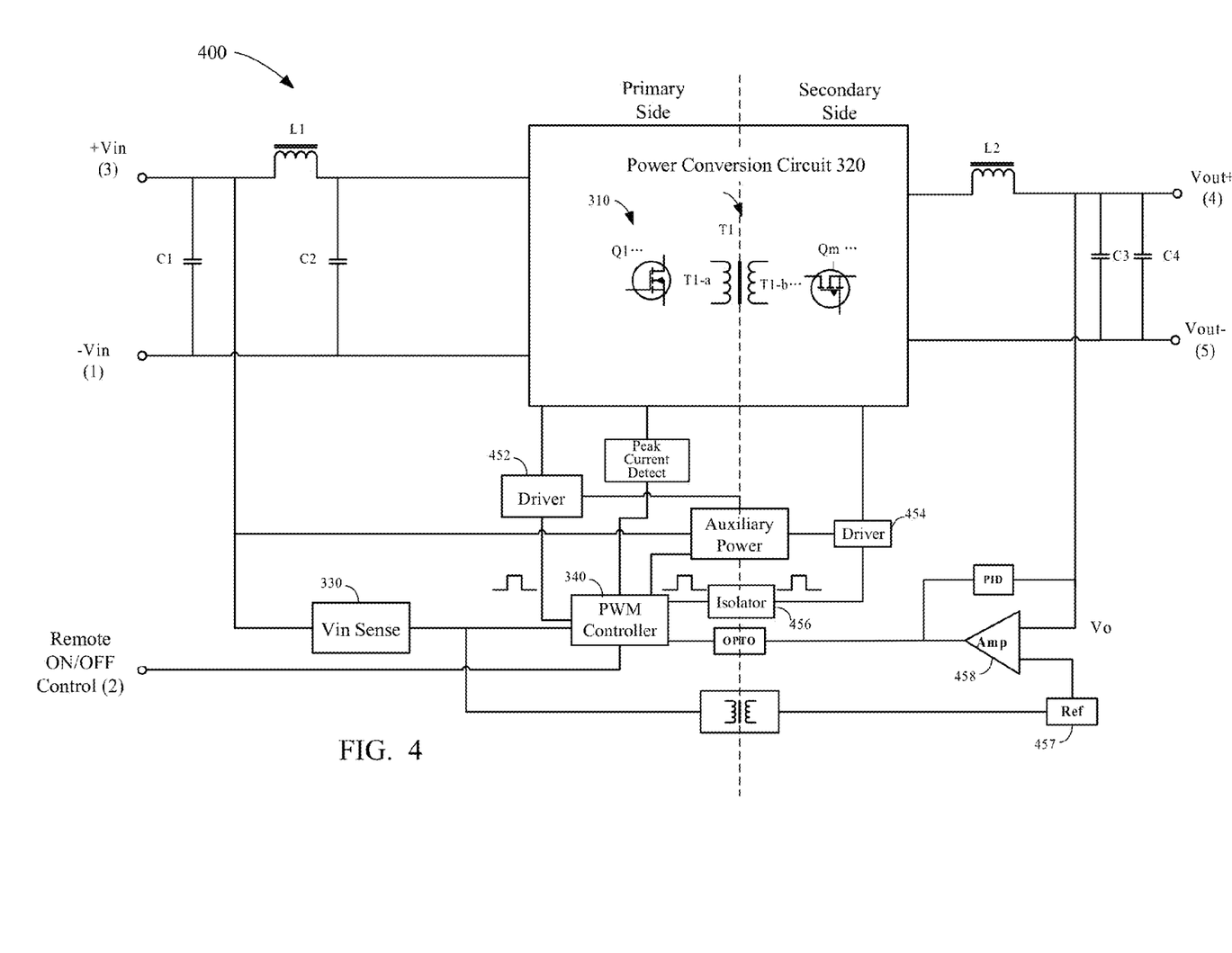
FIG. 4 illustrates a schematic diagram of an exemplary power converter corresponding to FIG. 3 according to a preferred embodiment of the present invention.

FIG. 4 illustrates a schematic diagram of an exemplary power converter 400 corresponding to FIG. 3 according to a preferred embodiment of the present invention. The structures and operations of the power converter 400 as shown in FIG. 4 similar to that in FIG. 2 is not repeated here. As illustrated, the input voltage Vin, after being filtered by a filtering circuit, is inputted into a primary winding T1-*a* of a transformer T1 under control of the switching circuit 310, so as to generate an output on a secondary winding T1-*b*, thus providing an output voltage Vout and an output current Iout through a secondary switching circuit and an output filter. The power converter 400 may include a driver 452 configured and programmed to control the on/off of the primary switching circuit 310 according to a control signal generated by the PWM controller 340, and a driver 454 configured and programmed to control the on/off of a secondary switch Qm, etc., according to a control signal generated by the PWM controller 340. The secondary switch Qm may be controlled by other control signals (e.g. a voltage on the secondary winding of the transformer T1, not shown), without including the driver 454.

In one preferred embodiment of the present invention, the power converter 400 may be an isolated power converter, wherein the PWM controller 340 may be located on the input (primary) or output (secondary) side of the power converter 400, and the signals on one side may be transferred to the other side in an isolated manner (e.g., via a transformer, OPTO coupling, etc.). FIG. 4 schematically illustrates that the PWM controller 340 is located on the primary side of the power converter 400. The PWM controller 340 may be located on the secondary side of the power converter 400 and functions similarly. To effectively isolate the primary side and the secondary side of the transformer T1, the power converter 400 may include an isolator 456, to transfer in an isolated manner the control signals generated by the PWM controller 340 at the primary side to the secondary side of the power converter 400. The isolator 456 may be implemented by any isolation circuit known in the art, for example, a transformer, an optical coupler, etc.

As noted above, the power converter 400 may further include an output sense circuit 350 (not shown, see FIG. 3) configured to detect the output voltage Vout and generate an output voltage sense signal Vo. The power converter 400 may further include an operational amplifier 458 configured to generate a comparison signal based on a difference between the output voltage sense signal Vo and a reference voltage Vref, wherein the comparison signal is provided to the PWM controller 340 as a feedback signal to control the duty cycle of the switching circuit 310 such that the output voltage Vout is maintained on a level proportional to Vref. For example, if the output voltage sense signal Vo is higher than the reference voltage Vref, the feedback signal causes the PWM controller 340 to reduce the duty cycle such that the output voltage Vout will decrease; if the output voltage sense signal Vo is lower than the reference voltage Vref, the feedback signal causes the PWM controller 340 to increase the duty cycle such that the output voltage Vout will increase.

In a preferred embodiment of the present invention, a reference voltage module 457 may generate the reference voltage Vref according to the input voltage sense signal Vi provided by the Vin sense circuit 330. For example, the reference voltage Vref may be proportional to the input voltage sense signal Vi, and thus proportional to the input voltage Vin. In the isolated system as shown in FIG. 4, the Vin sense circuit 330 may provide the reference voltage Vref to the secondary side through an isolation transport mechanism (such as a transformer, an optical coupler, etc.). In various implementations, the reference voltage Vref may be provided based on the input voltage Vin by any other approaches. As such, the reference voltage Vref varies along with the input voltage Vin. When the input voltage Vin changes, since the reference voltage Vref varies synchronously, the output voltage Vout will also vary based on the reference voltage Vref accordingly. In this case, the feedback signal provided by the operational amplifier 458 will not cause the PWM controller 340 to adjust the duty cycle, and the duty cycle maintains unchanged.

For example, for a hard switching full bridge transformer using a turn ratio of 4:1, with a duty cycle of 45%,
If Vin=36V, Vref=1V, then Vout=36/4*2*45%=8.1V;
If Vin=48V, Vref=1.333V, then Vout=8.1*1.333=10.8V;
If Vin=60V, Vref=1.667V, then Vout=8.1*1.667=13.5V.

On the other hand, if the input voltage Vin does not change, but the output voltage Vout changes due to other factors, since the reference voltage Vref does not change, the feedback signal provided by the operational amplifier 458 will cause the PWM controller 340 to adjust the duty cycle such that the output voltage Vout is maintained on a level proportional to Vref. For example, a load increase may result in a drop of the output voltage Vout, then the feedback signal provided by the operational amplifier 458 may cause the PWM controller 340 to increase the duty cycle, so as to maintain the output voltage Vout unchanged. As a non-limiting example, if Vin=48V, a change from zero load to full load may potentially lead to a drop in Vout, which may be maintained at Vout=10.8V, for example, by adjusting the duty cycle (e.g., increasing the duty cycle).

Figure 5:
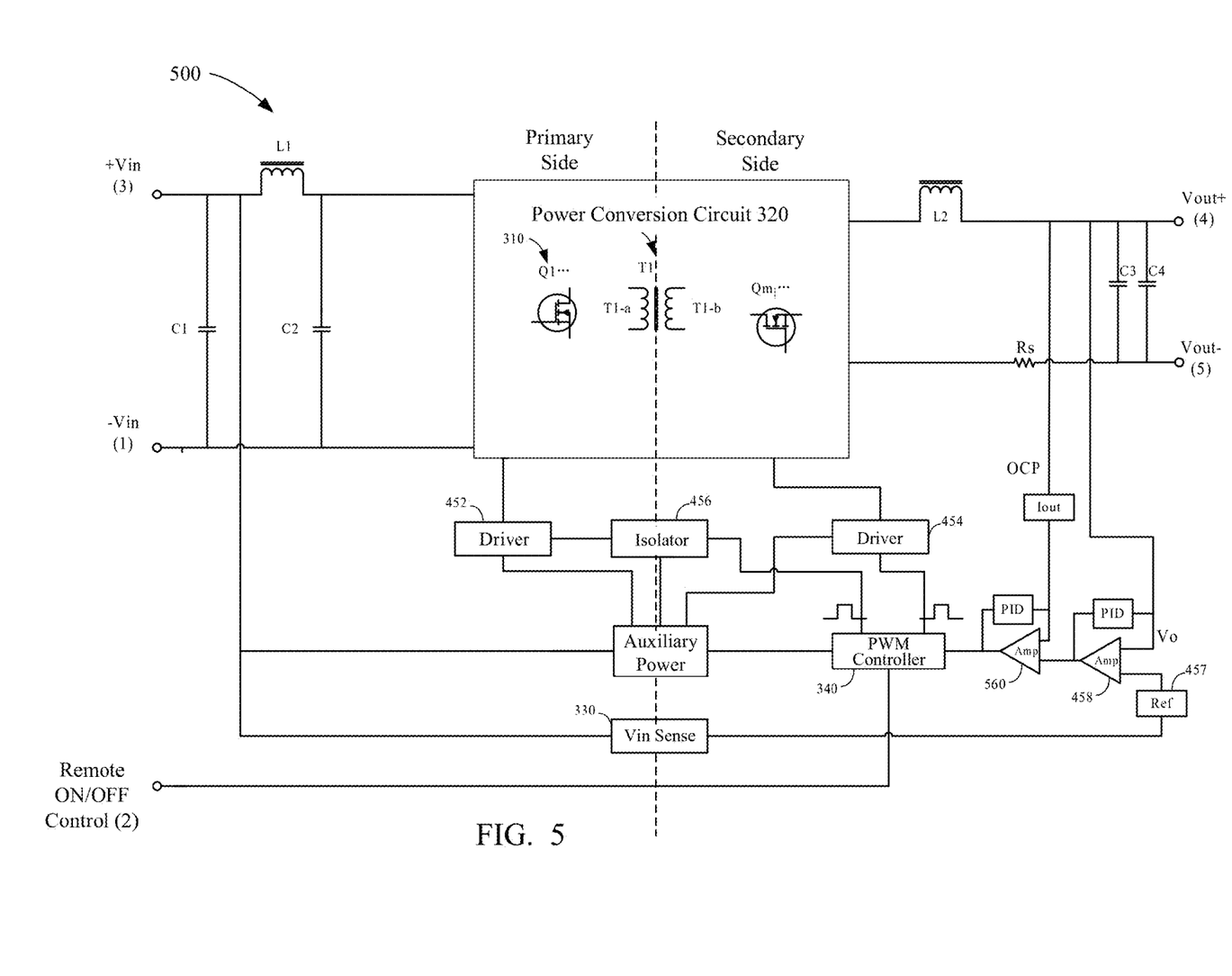
FIG. 5 illustrates a schematic diagram of another exemplary power converter corresponding to FIG. 3 according to a preferred embodiment of the present invention.

FIG. 5 illustrates a schematic diagram of another exemplary power converter 500 corresponding to FIG. 3 according to a preferred embodiment of the present invention, wherein the PWM controller 340 adjusts the duty cycle of the switching circuit 310 according to the input voltage Vin, the output voltage Vout and the output current Iout. The structures and operations of the power converter 500 as shown in FIG. 5 similar to that in FIG. 4 is not repeated here. FIG. 5 schematically illustrates that the PWM controller 340 is located on the secondary side of the power converter 500. The PWM controller 340 may be located on the primary side of the power converter 500 and functions similarly. As illustrated, a first operational amplifier 458 provides a first comparison signal based on a difference between the output voltage sense signal Vo and the reference voltage Vref, and a second operational amplifier 560 generates a second comparison signal based on a difference between the output current sense signal Io and the first comparison signal, wherein the second comparison signal is provided to the PWM controller 340 as a feedback signal, to control the duty cycle of the switching circuit 310. Such power converter 500 may include an over-current protection (OCP) mechanism such that the PWM controller 340 may turn off the switching circuit 310 when the output current is too large. As described with reference to FIG. 4, the reference voltage Vref may vary along with the input voltage Vin. Therefore, if the output voltage Vout varies due to the change of the input voltage Vin, the PWM stably adjusts the duty cycle if the power converter 500 has an over-current protection (OCP) mechanism.

If the input voltage Vin does not change, but the output current Iout varies due to factors such as the load, the feedback signal provided by the operational amplifier 560 will cause the PWM controller 340 to adjust the duty cycle such that the output voltage Vout is maintained on a level proportional to Vref. For example, as the load increases, the output current Iout will decrease, then the feedback signal provided by the operational amplifier 560 causes the PWM controller 340 to increase the duty cycle, so as to maintain the output voltage Vout unchanged. Similarly, the duty cycle of the switching circuit 310 may be adjusted within a relatively narrow range, so as to achieve a high efficiency while maintaining good load regulation.

Figure 6:
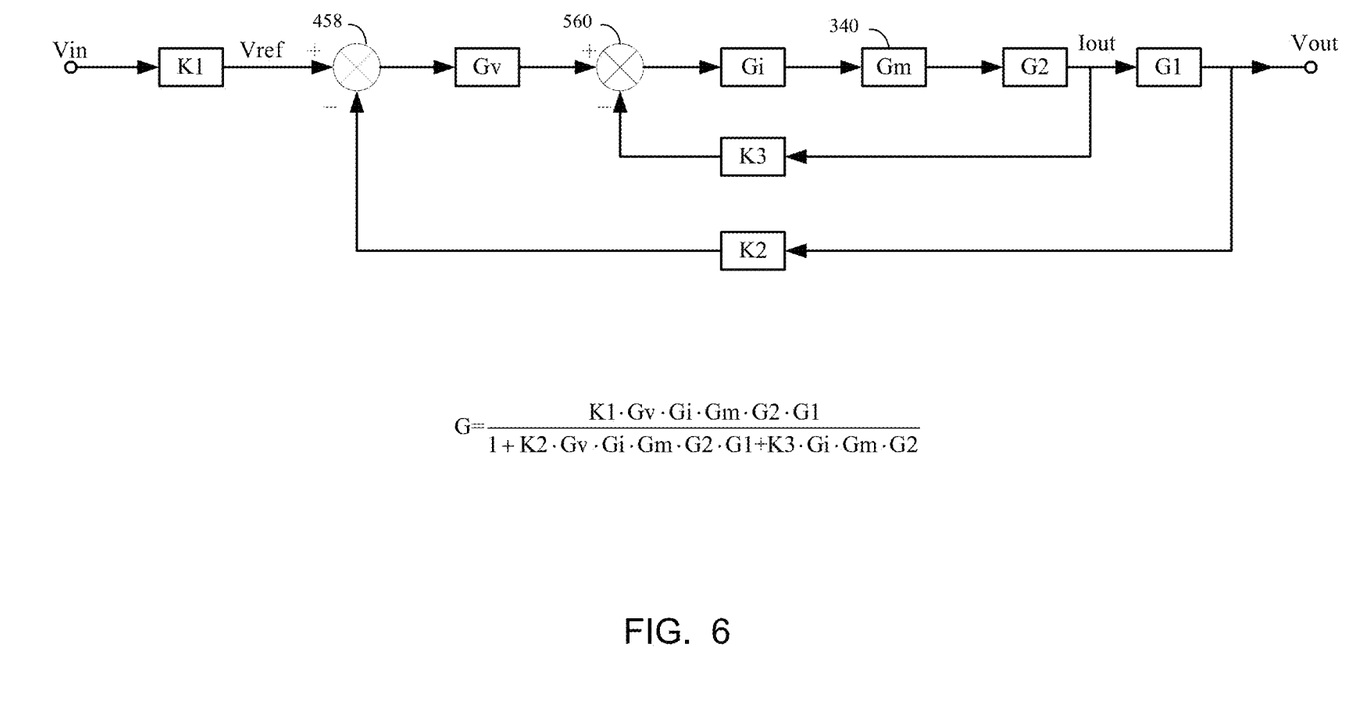
FIG. 6 illustrates a signal model diagram of the exemplary power converter as in FIG. 5 according to a preferred embodiment of the present invention.

FIG. 6 illustrates a signal model diagram of the exemplary power converter 500 as in FIG. 5 according to a preferred embodiment of the present invention. As described above, the reference voltage Vref is controlled based on the input voltage Vin, e.g., Vref=K1·Vin, wherein K1 is a scaling factor that may be configured by those skilled in the art as desired. The first operational amplifier 458 calculates and amplifies (e.g., multiplying with a coefficient Gv by proportional-integral-derivative (PID)) a difference between the detected output voltage sense signal Vo (e.g., equal to K2·Vout, wherein K2 is, for example, a scaling factor that may be configured as desired) and the reference voltage Vref, to generate the first comparison signal. The second operational amplifier 560 calculates and amplifies (e.g., multiplying with a coefficient Gi by PID) a difference between the detected output current sense signal Io (e.g., equal to K3·Iout, wherein K3 is, for example, a scaling factor that may be configured as desired) and the first comparison signal, to generate the second comparison signal as a feedback signal. The PWM controller 340 may process the feedback signal (e.g., multiplying with a scaling factor Gm) to control the duty cycle of the switching circuit 310. The parameter G2 is an equivalent transconductance value of the power train (e.g., the power conversion circuit 320), and G1 is an equivalent transconductance value of the secondary output circuit. Therefore, the transconductance of the power converter 500 may be equivalent to:

$$G = \frac{K1 \cdot Gv \cdot Gi \cdot Gm \cdot G2 \cdot G1}{1 + K2 \cdot Gv \cdot Gi \cdot Gm \cdot G2 \cdot G1 + K3 \cdot Gi \cdot Gm \cdot G2}$$

As can be seen from FIG. 6, the power converter 500 preferably includes two control loops, including an outer loop implemented by the first operational amplifier 458 and an inner loop implemented by the second operational amplifier 560. The outer loop control may maintain the duty cycle unchanged when the input voltage Vin changes, while the inner loop control may adjust the duty cycle when the output current Iout changes, so as to achieve a high efficiency and good load regulation.

Figure 7A:
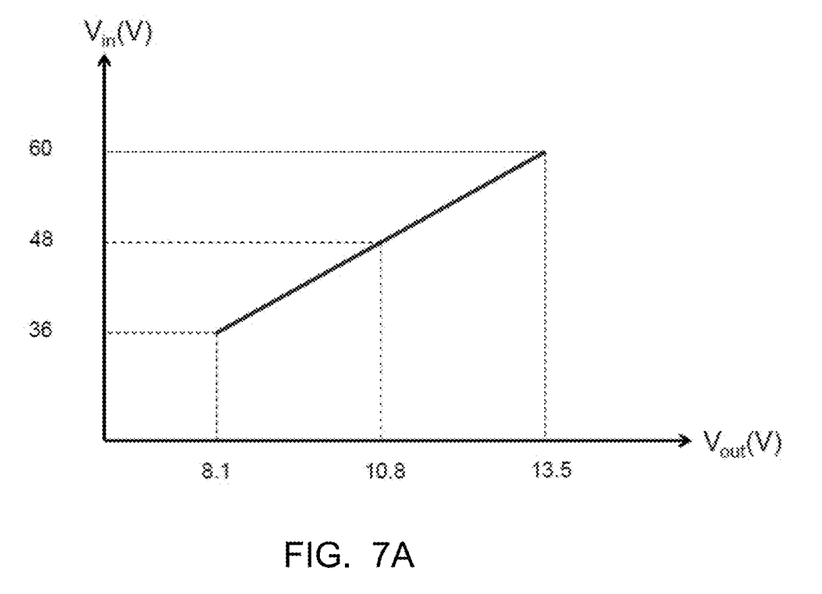
FIGS. 7A and 7B illustrate schematic waveform diagrams according to a preferred embodiment of the present invention.
Figure 7B:
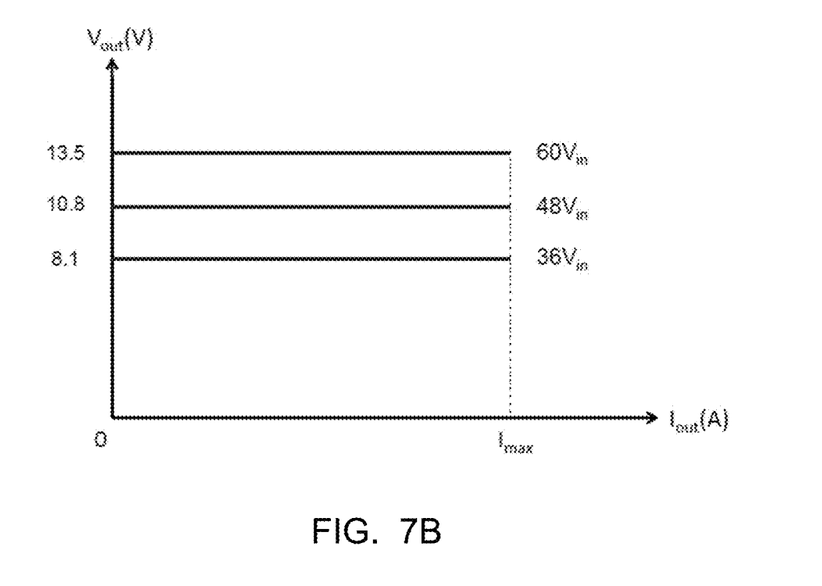

FIGS. 7A and 7B illustrate schematic waveform diagrams according to a preferred embodiment of the present invention, for example, corresponding to the power converters as shown in FIGS. 3-6. As illustrated in FIG. 7A, by adjusting the value of the reference voltage Vref based on the input voltage Vin, the output voltage Vout will varies proportionally to the change of the input voltage Vin and the duty cycle does not change, ensuring the high efficiency. As illustrated in FIG. 7B, if the input voltage Vin does not change, as the load changes (then the output current Iout will change), Vout may maintains unchanged by adjusting the duty cycle within a relatively narrow range to maintain, so as to have good load regulation.

As described above, the power converters according to various preferred embodiments of the present invention adjust the duty cycle within a relatively narrow variation range, so as to provide good load regulation. As compared with a DC/DC converter that adjusts the duty cycle within a full range, the power converters according to various preferred embodiments of the present invention achieve a higher efficiency. Meanwhile, since the duty cycle is adjusted within a relatively narrow range, the power converters according to various preferred embodiments of the present invention have a simple circuit structure, the design for the output inductor achieves a better DCR (internal resistance of the inductor), and a lower inductance and a small size is used, thus a high power density is achieved.

The operations described in connection with the aspects disclosed herein may be implemented in hardware, in software modules executed by a processor, or in combinations of both. For example, the PWM controller described herein may be implemented by a microprocessor, which may be programmed to generate a PWM control signal according to the input voltage, the output voltage (and/or the output current), to control the duty cycle of the switching circuit.

It should be understood that, the above preferred embodiments are exemplary illustrations of the present invention, and do not limit of the present invention. The various circuit structures and signal levels shown herein are exemplary, and may be modified as necessary in practice. Any applications without departing from the spirit of the present invention fall within the scope of the present invention, including isolated systems, non-isolated systems, constant current systems, constant voltage systems, intermediate bus converters, boost converters, buck converters, etc., and alternation to local construction of the circuits, the substitution of type or model of elements, other variations of the signal levels, as well as other non-substantial alterations and modifications.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power converter, comprising:
a switching circuit;
a power conversion circuit configured to receive an input voltage via the switching circuit and convert the input voltage into an output voltage;
an input voltage sense circuit configured to detect the input voltage and generate an input voltage sense signal;
an output sense circuit configured to:

detect the output voltage and generate an output voltage sense signal; and
detect an output current and generate an output current sense signal;
a reference voltage module configured to generate a reference voltage based on the input voltage sense signal provided by the input voltage sense circuit such that the reference voltage is proportional to the input voltage; and
a first operational amplifier configured to generate a first comparison signal based on a difference between the output voltage sense signal and the reference voltage;
a second operational amplifier configured to generate a second comparison signal based on a difference between the output current sense signal and the first comparison signal, the second comparison signal being provided as a feedback signal; and
a PWM controller configured and programmed:
if the input voltage sense signal indicates a change in the input voltage, to adjust a duty cycle of the switching circuit within a preset range independent of the output voltage, wherein the PWM controller is configured and programmed to increase the duty cycle of the switching circuit if the input voltage sense signal indicates a decrease in the input voltage and to decrease the duty cycle of the switching circuit if the input voltage sense signal indicates an increase in the input voltage, such that the output voltage varies with the input voltage and such that a change rate of the output voltage is lower than a change rate of the input voltage; and
to adjust the duty cycle of the switching circuit within a preset range according to the feedback signal such that the output voltage is maintained on a level proportional to the reference voltage.

2. The power converter of claim 1, wherein
if the input voltage does not change, the PWM controller adjusts the duty cycle of the switching circuit within a preset range such that the output voltage remains unchanged.

3. The power converter of claim 1, wherein the power converter is an isolated power converter, and includes an isolator to transfer signals in an isolated manner between a primary side and a secondary side of the power converter.

4. A method for controlling a power converter, comprising:
receiving an input voltage via a switching circuit and converting the input voltage into an output voltage;
detecting the input voltage and generating an input voltage sense signal;
if the input voltage sense signal indicates a change in the input voltage, adjusting a duty cycle of the switching circuit within a preset range independent of the output voltage, wherein the duty cycle of the switching circuit is increased if the input voltage sense signal indicates a decrease in the input voltage and the duty cycle of the switching circuit is decreased if the input voltage sense signal indicates an increase in the input voltage, such that the output voltage varies along with the input voltage and such that a change rate of the output voltage is lower than a change rate of the input voltage;
detecting the output voltage and generating an output voltage sense signal;
detecting an output current and generating an output current sense signal;

generating a reference voltage based on the input voltage sense signal such that the reference voltage is proportional to the input voltage;
generating a first comparison signal based on a difference between the output voltage sense signal and the reference voltage;
generating a second comparison signal based on a difference between the output current sense signal and the first comparison signal as a feedback signal; and
adjusting the duty cycle of the switching circuit within a preset range according to the feedback signal such that the output voltage is maintained on a level proportional to the reference voltage.

5. The method of claim 4, wherein:
if the input voltage does not change, the duty cycle of the switching circuit is adjusted within a preset range such that the output voltage remains unchanged.

6. The method of claim 4, wherein
the power converter is an isolated power converter; and
the method further comprises:
transferring signals in an isolated manner between a primary side and a secondary side of the power converter.

7. A power converter, comprising:
means for receiving an input voltage via a switching circuit and converting the input voltage into an output voltage;
means for detecting the input voltage and generating an input voltage sense signal;
means for detecting the output voltage and generating an output voltage sense signal;
means for detecting an output current and generating an output current sense signal;
means for generating a reference voltage based on the input voltage sense signal such that the reference voltage is proportional to the input voltage;
means for generating a first comparison signal based on a difference between the output voltage sense signal and the reference voltage;
means for generating a second comparison signal based on a difference between the output current sense signal and the first comparison signal as a feedback signal;
means for adjusting a duty cycle of the switching circuit within a preset range independent of the output voltage, if the input voltage sense signal indicates a change in the input voltage, wherein the duty cycle of the switching circuit is increased if the input voltage sense signal indicates a decrease in the input voltage and the duty cycle of the switching circuit is decreased if the input voltage sense signal indicates an increase in the input voltage, such that the output voltage varies along with the input voltage and such that a change rate of the output voltage is lower than a change rate of the input voltage; and
means for adjusting the duty cycle of the switching circuit within a preset range according to the feedback signal such that the output voltage is maintained on a level proportional to the reference voltage.

8. The power converter of claim 7, wherein:
if the input voltage does not change, the duty cycle of the switching circuit is adjusted within a preset range such that the output voltage remains unchanged.

9. The power converter of claim 7, wherein
the power converter is an isolated power converter; and
the power converter further comprises:

means for transferring signals in an isolated manner between a primary side and a secondary side of the power converter.

10. A power converter comprising:
a switching circuit;
a power conversion circuit configured to receive an input voltage via the switching circuit and convert the input voltage into an output voltage;
an input voltage sense circuit configured to detect the input voltage and generate an input voltage sense signal;
a PWM controller configured and programmed, if the input voltage sense signal indicates a change in the input voltage, to adjust a duty cycle of the switching circuit within a preset range independent of the output voltage, such that the output voltage varies with the input voltage and such that a change rate of the output voltage is lower than a change rate of the input voltage;
an output sense circuit configured to detect the output voltage and generate an output voltage sense signal, wherein the output sense circuit further detects an output current and generates an output current sense signal;
a reference voltage module configured to generate a reference voltage based on the input voltage sense signal provided by the input voltage sense circuit such that the reference voltage is proportional to the input voltage;
a first operational amplifier configured to generate a first comparison signal based on a difference between the output voltage sense signal and the reference voltage; and
a second operational amplifier configured to generate a second comparison signal based on a difference between the output current sense signal and the first comparison signal;
wherein the PWM controller is further configured and programmed to adjust the duty cycle of the switching circuit according to the second comparison signal such that the output voltage is maintained on a level proportional to the reference voltage.

11. The power converter of claim 10, wherein:
if the input voltage does not change, the PWM controller adjusts the duty cycle of the switching circuit within a preset range such that the output voltage remains unchanged.

12. The power converter of claim 10, wherein the power converter is an isolated power converter and includes an isolator to transfer signals in an isolated manner between a primary side and a secondary side of the power converter.

13. A method for controlling a power converter comprising:
receiving an input voltage via a switching circuit and converting the input voltage into an output voltage;
detecting the input voltage and generating an input voltage sense signal;
if the input voltage sense signal indicates a change in the input voltage, adjusting a duty cycle of the switching circuit within a preset range independent of the output voltage, such that the output voltage varies along with the input voltage and such that a change rate of the output voltage is lower than a change rate of the input voltage;
detecting the output voltage and generating an output voltage sense signal;
detecting an output current and generating an output current sense signal;

generating a reference voltage based on the input voltage sense signal such that the reference voltage is proportional to the input voltage;

generating a first comparison signal based on a difference between the output voltage sense signal and the reference voltage;

generating a second comparison signal based on a difference between the output current sense signal and the first comparison signal; and adjusting the duty cycle of the switching circuit according to the second comparison signal such that the output voltage is maintained on a level proportional to the reference voltage.

14. The method of claim 13, wherein:

if the input voltage does not change, the duty cycle of the switching circuit is adjusted within a preset range such that the output voltage remains unchanged.

15. The method of claim 13, wherein:

the power converter is an isolated power converter; and the method further includes transferring signals in an isolated manner between a primary side and a secondary side of the power converter.

16. A power converter comprising:

means for receiving an input voltage via a switching circuit and converting the input voltage into an output voltage;

means for detecting the input voltage and generating an input voltage sense signal;

means for, if the input voltage sense signal indicates a change in the input voltage, adjusting a duty cycle of the switching circuit within a preset range independent of the output voltage, such that the output voltage varies along with the input voltage and such that a change rate of the output voltage is lower than a change rate of the input voltage;

means for detecting the output voltage and generating an output voltage sense signal;

means for detecting an output current and generating an output current sense signal;

means for generating a reference voltage based on the input voltage sense signal such that the reference voltage is proportional to the input voltage;

means for generating a first comparison signal based on a difference between the output voltage sense signal and the reference voltage;

means for generating a second comparison signal based on a difference between the output current sense signal and the first comparison signal; and means for adjusting the duty cycle of the switching circuit according to the second comparison signal such that the output voltage is maintained on a level proportional to the reference voltage.

17. The power converter of claim 16, wherein:

if the input voltage does not change, the duty cycle of the switching circuit is adjusted within a preset range such that the output voltage remains unchanged.

18. The power converter of claim 16, wherein the power converter is an isolated power converter; and the power converter further includes means for transferring signals in an isolated manner between a primary side and a secondary side of the power converter.

* * * * *